3,186,994
POLYCHLOROPYRIDINES
Howard Johnston, Concord, and Mary S. Tomita, Walnut Creek, Calif., assignors to The Dow Chemical Company, Midland, Mich., a corporation of Delaware
No Drawing. Filed Oct. 18, 1962, Ser. No. 231,581
10 Claims. (Cl. 260—290)

The present invention relates to polychloropyridines and more particularly to improved processes for the preparation of pyridines having at least three ring chloro substituents.

Polychloropyridines are compounds highly valuable as intermediates in the preparation of numerous compounds having application in the agricultural chemical field. The compounds are also directly useful as herbicides, particularly for the control of wild oats.

Polychloropyridines with which the present invention is concerned have heretofore been very difficultly available, even in small amounts. Isomeric trichloropyridines, isomeric tetrachloropyridines and pentachloropyridine have been detected in reactions of pyridine with phosphorous pentachloride. 2,3,5,6-tetrachloropyridine has been obtained in small amounts in the reaction of nicotinic acid with a mixture of phosphorus oxychloride and phosphorus pentachloride, and in the hydrolysis of 2,3,5,6-tetrachloroisonicotinic acid. Pentachloropyridine has been identified in reactions of dichloroisonicotinic acid or tetrachloro pyridine with phosphorus pentachloride. These procedures generally produce insignificant yields of product, frequently in amounts reported only as detectable. Moreover, a wide range of products is obtained, frequently more than eight components, thus requiring arduous separation procedures. In addition, the procedures usually require long reaction times and further require methods or materials which are not readily adaptable to moderate or large scale preparations. Thus, these methods have not been useful as preparative methods. A reasonably rapid preparative method which produces a high yield of desired product and which is substantially free from numerous by-products thereby obviating the necessity for tedious isolation procedures is highly desirable.

It is an object of the present invention to provide methods for the preparation of polychloropyridines containing at least 3 chlorine atoms. Another object of the invention is to provide a method by which high yields of the desired products may be obtained. An additional object is to provide procedures whereby the desired products may be obtained in relatively high purity rendering unnecessary, difficult and tedious isolation procedures. A further object is to provide a method which is adaptable to large scale operation and in which preparative amounts may be produced rapidly. A still further object is to provide preparative methods for the production of 2,3,5,6-tetrachloropyridine, 2,3,4,5-tetrachloropyridine, 2,3,6-trichloropyridine, 2,4,6-trichloropyridine and pentachloropyridine.

It has been discovered that polychloropyridines having the formula

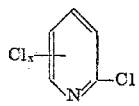

(I)

wherein in this and succeeding formulas, $x$ is an integer of from 2 to 4, inclusive, may be prepared in good yields and in high purity by a method wherein chlorine is reacted with a polychloro-(trichloromethyl)pyridine compound having the formula

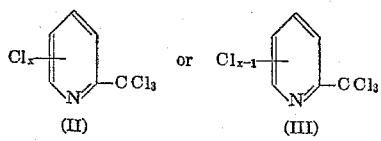

In the reaction, the —$CCl_3$ is replaced by a chloro radical with or without accompanying replacement of hydrogen to produce the desired polychloropyridine compound product and carbon tetrachloride by-product, with or without accompanying hydrogen chloride. The reactions taking place may be represented by the following equations:

(A)  $(II) + Cl_2 \rightarrow (I) + CCl_4$
(B)  $(III) + Cl_2 \rightarrow (I) + CCl_4 + HCl$ The reactions may be carried out in the liquid or the vapor phase.

In the preparation of the polychloropyridines by a liquid phase process, gaseous chlorine is passed through the appropriate polychloro-(trichloromethyl)pyridine starting material maintained in the liquid state by heating to a preferred temperature of at least 160° C. The chlorine gas reactant is employed in excess. The exact amount is not critical but from about 5 to 10 molar proportions of chlorine per mole of reactant is considered desirable. The continuous passage of excess chlorine gas through the reaction mixture serves not only to supply a large amount of reactant but to sweep out the carbon tetrachloride and hydrogen chloride (when formed) by-products. The most suitable rate at which to administer chlorine gas varies with the reaction temperature, intensity if irradiation, presence or absence of agitation, volume of reaction mixture, etc. A satisfactory rate is considered to be in the range of from about 0.3 to about 3 moles per hour when employing about 1 mole of the polychloro-(trichloromethyl)pyridine reactant.

The reaction may be carried out at temperatures as high as 250° C. or more. When the reaction is carried out at atmospheric pressure, most efficient operations are obtained at a temperature in the range of from about 190° to about 210° C.; lower temperatures tend to slow the reaction or produce other products while higher temperatures tend to lead to excessive volatilization of the reactants and products. When a closed system is employed, wider temperature ranges may be employed and the reaction allowed to take place in the presence of excess chlorine under the internally developed pressure. A factor to be considered in determining a preferred reaction temperature is the starting material employed with respect to the particular product desired. Thus, in operations to be carried out according to Equation A above wherein chlorinolysis of the trichloromethyl group is to be made to occur without additional ring chlorination, and moreover where there is absent hydrogen in the alpha positions of the reactant, said reaction sometimes may be made to proceed at temperatures below 160° C. On the other hand, operations to be carried out according to Equation B above wherein displacement of ring hydrogen as well as chlorinolysis of the trichloromethyl group is to be made to occur, are carried out at higher temperatures. In any event, the preferred temperatures are the higher temperatures above set forth.

Although reaction takes place in the absence of irradiation, efficient operation requires irradiation of the reaction mixture. Commercially available ultraviolet light sources are suitable for the purpose. The time of reaction depends on the size of operation, the rate at which chlorine gas is administered, the pressure employed, and the temperature at which reaction is carried out. Good yields have been obtained in from about 1 to 7 hours.

In carrying out the liquid phase reaction, gaseous chlorine is passed through the appropriate polychloro-(trichloromethyl)pyridine while the reaction mixture is heated and irradiated with ultraviolet light. Passage of chlorine gas is continued for a period of time sufficient to allow completion of the reaction with the formation of the desired polychloropyridine. Thereafter, the reaction mixture is allowed to cool to room temperature whereupon the desired product may be recovered as a solid. The product may be purified by fractional distillation of the crude product and/or recrystallization from an appropriate solvent such as pentane, hexane, etc.

In the preparation of the polychloropyridine compounds by a vapor phase process, chlorine and polychloro-(trichloromethyl)pyridine are contacted and reacted in the gaseous phase in a heated chamber maintained in the temperature range of from about 450° to about 550° C. The preferred range is from about 500° to about 530° C. The reactants may be separately introduced into a heated reaction chamber where the polychloro-(trichloromethyl)pyridine compound vaporizes, comes into contact with the gaseous chlorine and forms a polychloropyridine product which is carried by positive gas pressure to a receiver where it is condensed and recovered. Preferably, the reactants are mixed in a preheater maintained at temperatures of from about 100° C. to about 300° C. and thereafter introduced into a reaction chamber where reaction takes place in the vapor phase.

In view of the relatively low volatility of the reactant polychloro-(trichloromethyl)pyridine reactant, the step of thoroughly contacting the reactants is facilitated by introducing the reactant polychloro-(trichloromethyl)pyridine in admixture with a diluent having the properties of ready volatility and inertness to chlorination. The preferred readily volatilized inert diluent is carbon tetrachloride, although water may also be used. The concentration of the polychloro(trichloromethyl)pyridine in the diluent may be from about 30 percent to 50 percent by weight. It is to be noted, however, that the process may be successfully carried out without diluent. In the reaction, gaseous chlorine is employed in excess. The preferred amounts are from about 4 to about 10 molar proportions of chlorine per mole of polychloro-(trichloromethyl)pyridine reactant. The excess chlorine creates a positive gaseous pressure throughout the system carrying the polychloropyridine product from the reactor to the receiver. The most suitable rate at which to administer chlorine gas varies with the reaction temperature, presence or absence of irradiation, intensity of irradiation, capacity of reactor, efficiency of reactor, etc. A suitable rate has been found to be such as to permit a pound of chlorine per hour to pass through a reactor of 5 liter capacity or a pound of 50 weight percent polychloro-(trichloromethyl)pyridine feed solution per hour to be introduced into a reactor of 1 liter capacity. These limits may be increased or decreased 50 percent without affecting good operability of the process.

After reaction, the products as well as unreacted polychloro-(trichloromethyl)pyridine are carried to the receiver, condensed therein and may be recovered therefrom. The unreacted chlorine may be recycled from the condenser through the reactor system. Although ambient temperatures are sufficient to cause condensation of the product from the gaseous mixture, external cooling is generally applied to increase efficiency of operation. In the vapor phase process, usually more than one polychloropyridine is obtained in the product; generally, the predominant product is that resulting from chlorine displacement of both —CCl₃ and one —H, i.e., a reaction according to Equation B. The products are readily separated by fractional distillation. For many applications, such as agricultural applications, mixtures of products may be utilized without separation. Thus, the process is adaptable to preferential preparation of a single product or for the preparation of a mixture enriched in polychloropyridines.

In a preferred method for carrying out the vapor phase reaction, gaseous chlorine and a carbon tetrachloride solution of the appropriate polychloro-(trichloromethyl)pyridine are mixed together in a preheated chamber whereupon a vaporous mixture is formed which is then carried by positive gas pressure into a reaction chamber where reaction takes place with the formation of the desired polychloropyridine products which is then conducted to a cooled receiver where the products and any unreacted starting materials are condensed and recovered. The products may be purified by fractional distillation and/or recrystallization from a hydrocarbon solvent.

The following examples illustrate the invention via the liquid phase methods but are not to be construed as limiting:

*Example 1.—2,3,5,6-tetrachloropyridine from 3,5-dichloro-2-(trichloromethyl)pyridine*

Chlorine gas was introduced at a rate of 0.5 mole per hour into a reaction vessel containing 259 grams (0.94 mole) of 3,5-dichloro-2-(trichloromethyl)pyridine while the mixture was irradiated with an ultraviolet light source of 275 watt intensity. Passage of chlorine gas was continued for 23 hours while the temperature was maintained in the range of about 190° to 210° C. to obtain the desired 2,3,5,6-tetrachloropyridine product. Vapor phase chromatographic analysis carried out on the product without prior purification showed that 89.8 mole percent of the product was the desired 2,3,5,6-tetrachloropyridine product.

*Example 2.—2,3,5,6-tetrachloropyridine from 3,5-dichloro-2-(trichloromethyl)pyridine*

In a similar operation, chlorine gas was passed through 397 grams (1.5 moles) of 3,5-dichloro-2-(trichloromethyl)pyridine while the mixture was irradiated with an ultraviolet light source of 275 watt intensity. The rate of chlorine flow was about 1.8 moles per hour and passage thereof was continued for about six hours while the temperature was maintained at about 195° C. to obtain a 2,3,5,6-tetrachloropyridine product. The crude product was fractionally distilled under reduced pressure and the fractions allowed to cool to room temperature whereupon the desired 2,3,5,6-tetrachloropyridine product crystallized as a white solid. The product on recrystallization from pentane had a melting point of 90°–92° C. The yield of the recrystallized product was 162 grams or 75 percent of theoretical.

*Example 3.—2,3,5,6-tetrachloropyridine from 2,3,5-trichloro-6-(trichloromethyl)pyridine*

In a similar manner, chlorine gas was introduced at a rate of 0.4 mole per hour into a reaction vessel containing 66 grams (0.22 mole) of 2,3,5-trichloro-6-(trichloromethyl)pyridine while the mixture was irradiated with ultraviolet light of 275 watt intensity. The temperature was maintained at about 145° C. while the passage of chlorine gas was continued for 2.75 hours to obtain 45 grams of a crude 2,3,5,6-tetrachloropyridine product. Vapor phase chromatographic analysis of the product showed that 92.12 mole percent of the product was the desired 2,3,5,6-tetrachloropyridine and 7.13 percent was pentachloropyridine. This amounts to an 87 percent conversion to the two products.

*Example 4.—Pentachloropyridine from 3,4,5-trichloro-2-(trichloromethyl)pyridine*

Chlorine gas was introduced at a rate of 0.45 mole per hour into a reaction vessel containing 270 grams (0.90 mole) of 3,4,5-trichloro-2-(trichloromethyl)pyridine for 13 hours while the temperature was maintained at about 250° C. Chlorination was continued for an additional six hours at the same rate of gas introduction and temperature but with irradiation from an ultraviolet light source of 275 watt intensity. At the end of this period, 197 grams of product (87 mole percent conversion) was recovered. Vapor phase chromatographic analysis of the product showed 96.0 mole percent to be the desired pentachloropyridine product and 4.0 mole percent to be 2,3,4,5 - tetrachloropyridine. The pentachloropyridine product melted at 123°–124° C.

*Example 5.—Pentachloropyridine from 2,3,4,5-tetrachloro-6-(trichloromethyl)pyridine*

In an operation carried out in a similar manner, chlorine gas was introduced at a rate of 0.3 mole per hour for one hour into a reaction vessel containing 20 grams (0.06 mole) of 2,3,4,5-tetrachloro-6-(trichloromethyl)pyridine at temperatures of about 100° C. to obtain 16 grams of crude pentachloropyridine product. Vapor phase chromatographic analysis of the product showed 87.47 mole percent to be the desired pentachloropyridine and the remainder to be unreacted starting material.

*Example 6.—2,3,6-trichloropyridine from 3-chloro-2-(trichloromethyl)pyridine*

In a similar operation, gaseous chlorine, at a rate of about 1 mole per hour, is bubbled through 3-chloro-2-(trichloromethyl)-pyridine at temperatures of from about 180°–190° C. to obtain good yields of 2,3,6-trichloropyridine product. The latter is recovered by distillation and purified by recrystallization from hexane. The melting point of 2,3,6-trichloropicoline is 65°–66° C.

*Example 7.—2,3,4,5-tetrachloropyridine composition from 3,4,5-trichloro-2-(trichloromethyl)pyridine composition*

Gaseous chlorine was bubbled through 68 pounds of a mixture of polychloro-(trichloromethyl)pyridines containing 81.2 mole percent of 3,4,5-trichloro-2-(trichloromethyl)pyridine while the mixture was externally heated under carefully controlled temperature conditions. The reaction mixture was first heated for 90 hours at 140° C. during which time the by-product carbon tetrachloride and light fractions were swept from the reaction vessel by the chlorine gas. After this period of heating, the reaction mixture was heated for 284 hours at 190° C. During this period, the mixture was slowly distilled to obtain as distillate 14.4 pounds of a mixture enriched in 2,3,4,5-tetrachloropyridine. The desired 2,3,4,5 - tetrachloropyridine having a molecular weight of 217 constituted 65.5 mole percent of the distillate; pentachloropyridine having a molecular weight of 252 constituted about 10 percent of the distillate; the remainder comprised polychloro-(trichloromethyl)-pyridines suitable for recycle.

The following examples illustrate the invention according to the vapor phase methods but are not to be construed as limiting:

*Example 8.—2,3,5,6-tetrachloropyridine and pentachloropyridine from 3,5-dichloro-2-(trichloromethyl)pyridine*

A 50 weight percent solution of 3,5-dichloro-2-(trichloromethyl)pyridine in carbon tetrachloride at a rate of 120 grams per hour and gaseous chlorine at a rate of 1 mile per hour were fed into a steam heated preheater to produce a vaporous mixture and the latter conducted into a heated reactor and reacted at temperatures of from 490° to 525° C. to produce a product composition containing 2,3,5,6-tetrachloropyridine having a molecular weight of 217 and pentachloropyridine having a molecular weight of 252. Vapor phase chromatographic analysis of the product composition indicated 55 mole percent 2,3,5,6-tetrachloropyridine, 19 mole percent pentachloropyridine, 6 percent trichloropyridines and 12 percent unreacted starting material.

*Example 9.—Pentachloropyridine from 3,4,5-trichloro-2-(trichloromethyl)pyridine*

In a manner similar to that described in Example 8, a 50 weight percent solution of 3,4,5-trichloro-2-(trichloromethyl)pyridine at a rate of about 156 grams per hour and gaseous chlorine at a rate of about 1 mole per hour were reacted at temperatures in the range of from about 500° to 510° C. to produce the desired pentachloropyridine product. Vapor phase chromatographic analysis indicated that 85 mole percent of the product to be pentachloropyridine. Pentachloropyridine has a melting point of 123°–124° C.

*Example 10.—Polychloropyridine composition from 2,3-dichloro-6-(trichloromethyl)pyridine*

In a manner similar to that described in Example 8, a 50 weight percent solution of 2,3-dichloro-6-(trichloromethyl)pyridine at a rate of about 134 grams per hour and gaseous chlorine at a rate of about 1 mole per hour were reacted in two passes, first pass at a temperature in the range of from 490° to 510° C. and second pass at temperatures in the range of 530° to 550° C. to obtain the desired polychloropyridine composition. Vapor phase chromatographic analysis of the product indicated the composition to comprise 43 percent of a mixture of 2,3,4,5- and 2,3,5,6-tetrachloropyridine, 18 percent pentachloropyridine and 8 percent isomeric trichloropyridines.

*Example 11.—Polychloropyridine composition from mixed chloropicolines*

In a similar manner, a chloropicoline mixture comprising 42 percent 3,5-dichloro-2-(trichloromethyl)pyridine, 14.2 percent 2,5-dichloro-6-(trichloromethyl)pyridine, 4.6 percent pentachloropyridine and 0.8 percent tetrachloropyridines was introduced at a rate of 108 grams per hour substantially simultaneously with chlorine at a rate of 1.3 mole per hour to a steam-heated preheater and thereafter reacted at temperatures in the range of from 450° to 480° C. to produce the desired polychloropyridine enriched composition. Vapor phase chromatographic analysis indicated the product composition to contain 37.2 percent pentachloropyridine, 34.8 percent tetrachloropyridines, 9.3 percent 3,5-dichloro-2-(trichloromethyl)pyridine and 1.8 percent 2,5-dichloro-6-(trichloromethyl)pyridine.

*Example 12.—2,4,6-trichloropyridine from 2-chloro-6-(trichloromethyl)pyridine*

A 50 weight percent solution of 2-chloro-6-(trichloromethyl)pyridine in carbon tetrachloride at a rate of 100 grams per hour and gaseous chlorine at a rate of 1 mole per hour are introduced into a preheater as previously described and thereafter reacted at about 500°–530° C. to produce good yields of 2,4,6-trichloropyridine having a molecular weight of 182.

*Example 13.—2,3,5,6-tetrachloropyridine from 2,3,5-trichloro-6-(trichloromethyl)pyridine*

In a similar manner, a 50 weight percent solution of 2,3,5-trichloro-6-(trichloromethyl)pyridine in carbon tetrachloride at a rate of 120 grams per hour and gaseous chlorine at a rate of 1 mole per hour are reacted at temperatures of from 510° to 540° C. to produce good yields of 2,3,5,6-tetrachloropyridine having a molecular weight of 217.

*Example 14.—Tetrachloropyridine and pentachloropyridine composition from dichloro-2-(trichloromethyl)-pyridine composition*

In a similar operation, but in absence of solvent, 133 grams of a liquid composition comprising polychloro-(trichloromethyl)pyridines and containing about 91 percent of 3,5-dichloro- and 5,6-dichloro-2-(trichloromethyl)pyridines, introduced at a rate of about 59 grams per hour, and gaseous chlorine introduced at a rate of about 1 mole per hour, were reacted in two passes, the first pass at a temperature in the range of from about 350° to 396° C. and the second pass at temperatures in the range of from about 476° to about 484° C. to obtain a composition enriched in 2,3,4,5-tetrachloropyridine having a molecular weight of 217, 2,3,5,6-tetrachloropyridine having a molecular weight of 217 and pentachloropyridine having a molecular weight of 252. Vapor phase chromatographic analysis indicated a yield of tetrachloropyridines of about 50 percent of theoretical and pentachloropyridine of about 14 percent of theoretical based on the dichloro-2-(trichloromethyl)pyridines in the reactant composition.

*Example 15.—2,3,5,6-tetrachloropyridine from mixed chloro(trichloromethyl)pyridine composition*

In a similar operation, 320 pounds of a chlorination mixture comprising various mono- and polychloro-2-(trichloromethyl)pyridines and containing only 1.3 mole percent of 2,3,5,6-tetrachloropyridine was introduced into an evaporator at a rate of 3 pounds per hour together with carbon tetrachloride at a rate of 5 pounds per hour to form a smooth vapor feed which was mixed with gaseous chlorine introduced at a rate of 1.8 pounds per hour; the resulting vaporous mixture was fed through a nozzle at a rate of about 50 feet per second into a reactor maintained at 470° C. wherein a desired chlorination took place to produce a product enriched in 2,3,5,6-tetrachloropyridine. Vapor phase chromatographic analysis of the product showed that the amount of 2,3,5,6-tetrachloropyridine in the product composition to be 31.7 mole percent, and the remainder of the mixture to be primarily mono- and polychloro-2-(trichloromethyl)pyridines suitable for recycle. The crude product was distilled and three fractions collected: Fraction A, 22.8 pounds; Fraction B, 83.1 pounds and Fraction C, 161.9 pounds. Recrystallization of Fraction B from hexane-pentane mixture produced 39.8 pounds of a purified 2,3,5,6-tetrachloropyridine product. The 2,3,5,6-tetrachloropyridine product has a melting point of 90–92° C.

The products obtained by the process of the present invention are useful for the control of undesirable plants and weed seed. Thus, in representative operations, aqueous compositions containing one of 2,3,5,6-tetrachloropyridine and pentachloropyridine give good controls of vegetation such as wild oats when applied at a dosage of 50 pounds per acre to soil planted therewith.

The products obtained by the present processes are also useful as intermediates in the preparation of compounds which have application as microbicides and pesticides. Thus, the polychloropyridines react with numerous organic compounds at the 2 and 4 positions to produce polychloropyridyl compounds useful, for example, for the control of soil dwelling pests.

The starting materials for the process according to present invention may be obtained passing gaseous chlorine through a liquid composition of α-picoline and hydrogen chloride under anhydrous conditions in the temperature range of from about 95° to about 230° C., the lower temperature favoring formation of reactants wherein $x$ is 3 or 4 in Formulas II and III and the higher temperatures favoring starting materials wherein $x$ is 2 in said formulas. The picoline chlorination mixture is then carefully fractionally distilled to obtain the desired reactant. The reactants may also be prepared by other known chlorination procedures.

We claim:

1. A method for preparing polychloropyridines having the formula

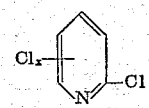

wherein $x$ is an integer of from 2 to 4, inclusive, which comprises contacting and reacting at temperatures of at least 160° C., chlorine and chloro(trichloromethyl)pyridine compounds having structures selected from the group consisting of

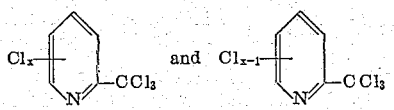

wherein $x$ is as above defined.

2. A method for preparing polychloropyridines having the formula

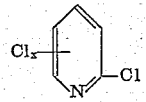

wherein $x$ is an integer of from 2 to 4, inclusive, which comprises passing gaseous chlorine through chloro(trichloromethyl)pyridine compounds in the liquid state at temperatures of at least 160° C., said chloro(trichloromethyl)pyridine compounds having structures selected from the group consisting of

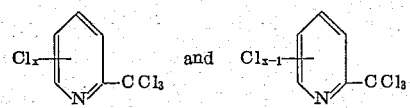

wherein $x$ is as above defined.

3. A method for preparing polychloropyridines having the formula

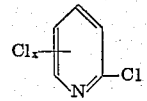

wherein $x$ is an integer of from 2 to 4, inclusive, which comprises passing gaseous chlorine through chloro(trichloromethyl)pyridine compounds in the liquid state at temperatures of from about 190° to about 210° C., said chloro(trichloromethyl)pyridine compounds having structures selected from the group consisting of

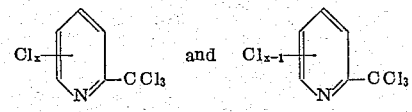

wherein $x$ is as above defined.

4. A method for preparing polychloropyridines having the formula

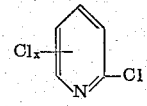

wherein $x$ is an integer of from 2 to 4, inclusive, which comprises contacting at temperatures of at least 450° C., gaseous chlorine and chloro(trichloromethyl)pyridine compounds in the vapor state, said chloro(trichloromethyl)pyridine compounds having structures selected from the group consisting of

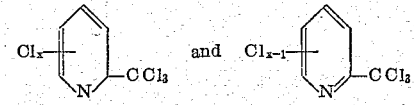

wherein $x$ is as above defined.

5. A method for preparing polychloropyridines having the formula

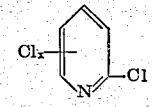

wherein $x$ is an integer of from 2 to 4, inclusive, which comprises contacting at temperatures of from about 500° C. to about 530° C., gaseous chlorine and chloro(trichloromethyl)pyridine compounds in the vapor state, said chloro(trichloromethyl)pyridine compounds having structures selected from the group consisting of

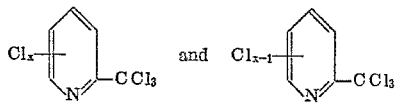

wherein x is as above defined.

6. A method for preparing polychloropyridines having the formula

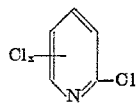

wherein $x$ is an integer of from 2 to 4, inclusive, which comprises contacting gaseous chlorine and chloro(trichloromethyl)pyridine compounds to produce mixtures thereof in the vapor state, thereafter reacting said chlorine and said chloro(trichloromethyl)pyridine compounds at a temperature of at least 450° C., said chloro(trichloromethyl)pyridine compounds having structures selected from the group consisting of

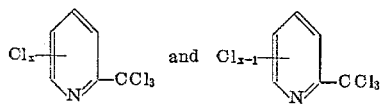

wherein $x$ is as above defined.

7. A method for preparing pentachloropyridine which comprises contacting and reacting chlorine and a polychloro-(trichloromethyl)pyridine selected from the group consisting of 3,4,5-trichloro-2-(trichloromethyl)pyridine and 2,3,4,5 - tetrachloro - 6 - (trichloromethyl)pyridine at temperature of at least 160° C.

8. A method for preparing 2,3,5,6-tetrachloropyridine which comprises contacting and reacting chlorine and a polychloro-(trichloromethyl)pyridine selected from the group consisting of 3,5-dichloro-2-(trichloromethyl)pyridine and 2,3,5-trichloro-6-(trichloromethyl)-pyridine at temperatures of at least 160° C.

9. A method for preparing 2,3,4,5-tetrachloropyridine which comprises contacting and reacting chlorine and a polychloro-(trichloromethyl)pyridine selected from the group consisting of 3,4,5-trichloro-2-(trichloromethyl)pyridine and 3,5-dichloro-2-(trichloromethyl)pyridine at temperatures of at least 160° C.

10. A method for preparing 2,3,6-trichloropyridine which comprises contacting and reacting chlorine and a chloro-(trichloromethyl)pyridine selected from the group consisting of 3-chloro-2-(trichloromethyl)pyridine and 2-chloro-6-(trichloromethyl)pyridine at temperatures of at least 160° C.

No references cited.

IRVING MARCUS, *Primary Examiner.*

JOHN D. RANDOLPH, WALTER A. MODANCE,
*Examiners.*